United States Patent [19]
Gilman

[11] 4,438,649
[45] Mar. 27, 1984

[54] APPARATUS FOR REMOTELY POSITIONING SENSING DEVICES IN A REACTOR DURING OPERATION THEREOF

[75] Inventor: Harris H. Gilman, Portola Valley, Calif.

[73] Assignee: Electric Power Research Institute, Inc., Palo Alto, Calif.

[21] Appl. No.: 288,381

[22] Filed: Jul. 29, 1981

[51] Int. Cl.³ .................. G01F 15/14; G01K 1/14; G21C 17/00
[52] U.S. Cl. ................. 73/432 R; 374/208; 376/245
[58] Field of Search ............ 73/432 B, 432 R; 374/139, 208, 210; 376/245, 247; 408/35; 136/230, 232, 233, 234; 338/48

[56] References Cited

U.S. PATENT DOCUMENTS

| | | | |
|---|---|---|---|
| 3,007,340 | 11/1961 | Kraftson | 73/432 B |
| 3,075,454 | 1/1963 | Henyan | 374/208 |
| 3,396,580 | 8/1968 | Cole | 374/139 |
| 3,643,508 | 2/1972 | Schneider | 73/432 B |
| 3,716,450 | 2/1973 | Lions | 376/247 |
| 3,717,034 | 2/1973 | Dukelow et al. | 374/208 |
| 3,766,005 | 10/1973 | Erkens | 376/245 |
| 3,956,062 | 5/1976 | Smith | 376/269 |
| 4,041,588 | 8/1977 | Kuhnert | 408/35 |
| 4,106,983 | 8/1978 | Meuschke et al. | 376/247 |
| 4,290,306 | 9/1981 | Murakami et al. | 374/139 |

*Primary Examiner*—Sal Cangialosi
*Attorney, Agent, or Firm*—Flehr, Hohbach, Test, Albritton & Herbert

[57] ABSTRACT

An apparatus for remotely positioning sensing devices within a reactor. The apparatus comprises a pressure-tight housing located adjacent to the reactor wherein the housing has a port connected by means of a passageway to an inlet of the reactor. Valve means are provided within the passageway for isolating the housing from the reactor. A plurality of cylinders are rotatably mounted within the housing about an axis thereof such that each of the cylinders may be aligned with the port in the housing. Each of the cylinders have a piston and a ram. The ram includes a sensing device such as a thermocouple. Means are provided for moving the piston within the cylinder such that when a cylinder is registered with the housing's port, the sensing device may be positioned in the reactor.

29 Claims, 5 Drawing Figures

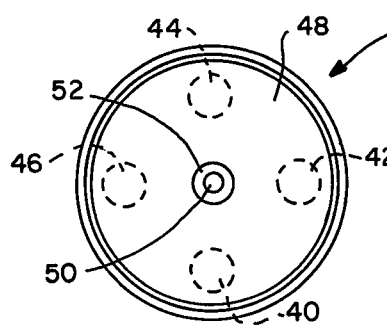
FIG.—1
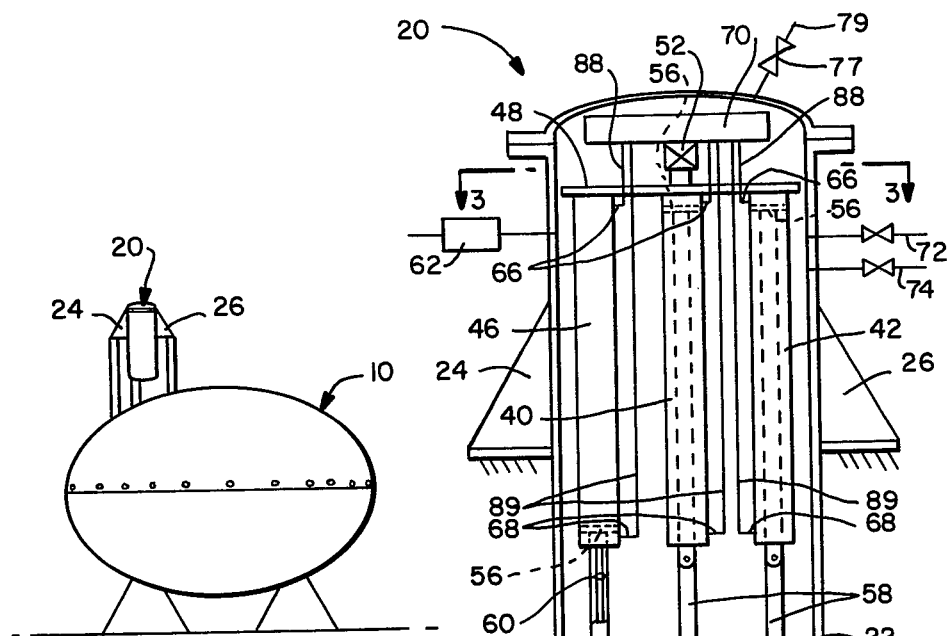
FIG.—3
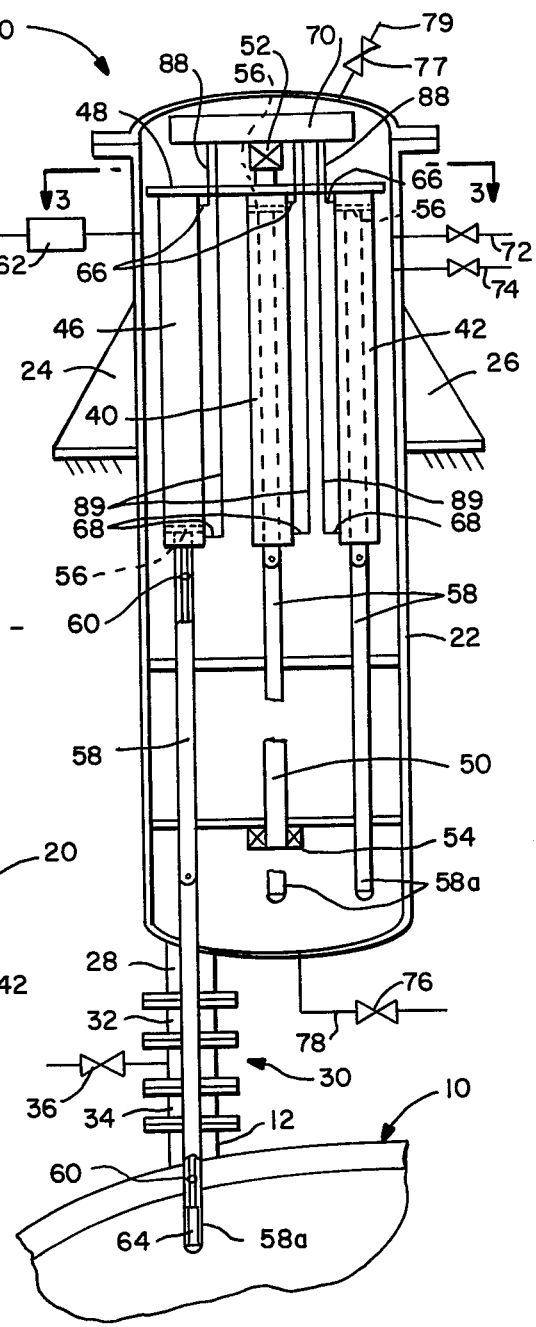
FIG.—2

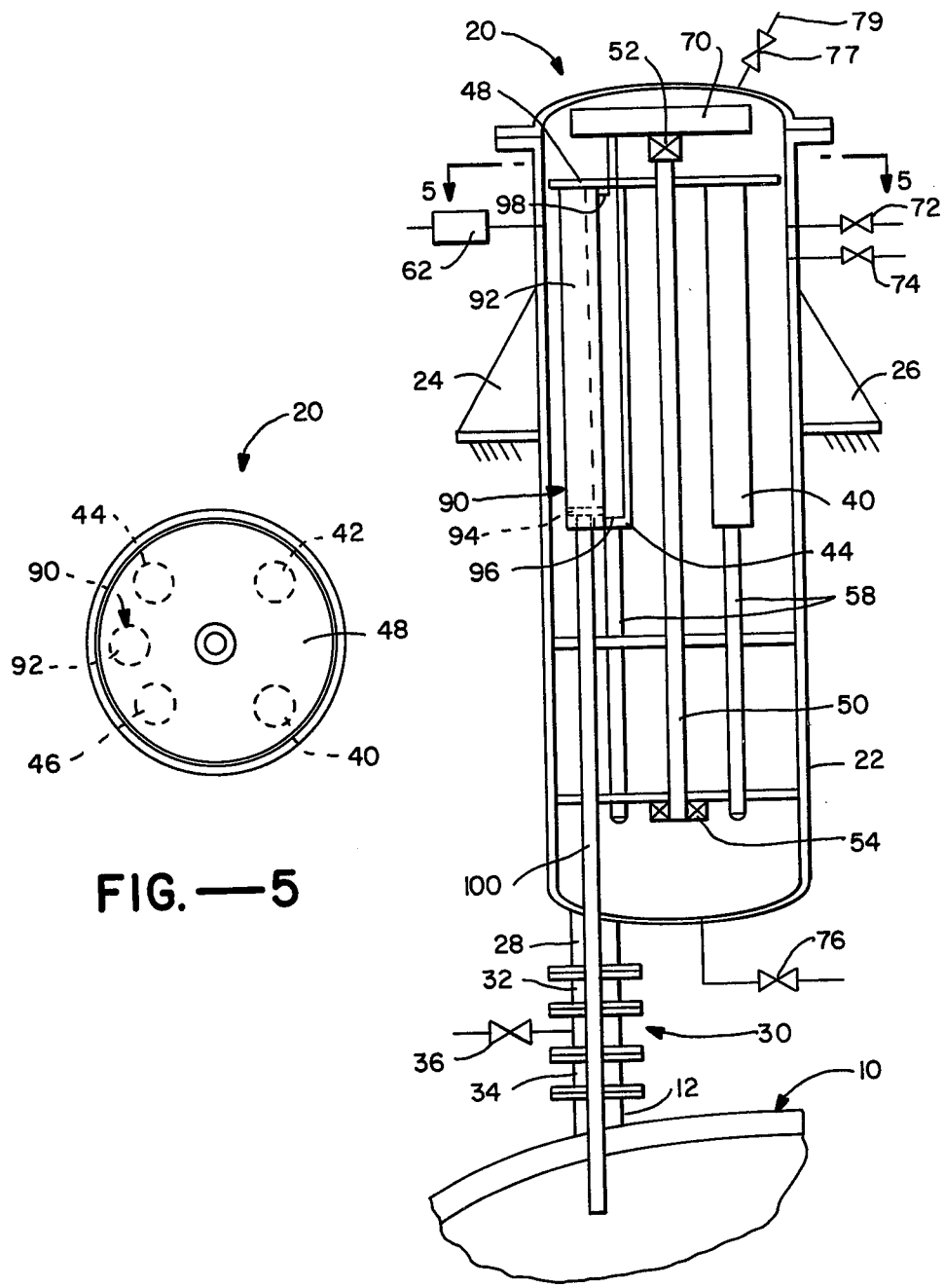
FIG.—5
FIG.—4

APPARATUS FOR REMOTELY POSITIONING SENSING DEVICES IN A REACTOR DURING OPERATION THEREOF

The present invention relates generally to apparatus for positioning sensing devices such as thermocouples within a reactor and more particularly to an apparatus for remotely inserting and removing sensing devices from a reactor during operation of the reactor.

Sensing devices, such as thermocouples, located within the interior of a coal gasification plant reactor are exposed to excessive temperature, pressure, and molten slag conditions. Under such hostile conditions, these devices do not function properly for very long periods of time. As accurate and continuous temperature readings in the reactor's interior are extremely important for safe and proper operation of the reactor, inoperative thermocouples must be immediately replaced. In the past, since the reactor is operated at very high temperatures and pressures, this has necessitated shutting down the reactor to gain access to the thermocouple. Shutting down the reactor however results in the loss of operating time and thus revenue.

Heretofore it has been known to place the sensing device such as a thermocouple in a protective sheath or thermowell for protection of the device. However, the reactor still had to be shut down in order to replace the sensing device and/or the protective sheath. The present invention permits the remote and automatic replacement of a sensing device and/or its protective sheath within an operating reactor.

The application of the present invention is not limited to coal gasification plant reactors nor is it limited to a particular type of sensing device. The present invention may be used with any type of reactor in which the operating conditions of the reactor would otherwise require shutdown of the reactor for replacement of sensing devices. For example, the invention may be used with the high temperature, high pressure reactors associated with petroleum processing. The present invention may also be used with nuclear reactors. The sensing devices may be any of the various types which provide process parameters.

An object of the present invention is to provide an apparatus for the remote positioning of sensing devices in a reactor during operation of the reactor.

A more specific object of the present invention is to provide an apparatus which permits the insertion and removal of sensing devices in a reactor without entailing shutdown of the reactor.

The apparatus of the present invention for remotely positioning sensing devices in a reactor comprises a pressure-tight housing located adjacent to the reactor wherein the housing has a port which is connected by means of a passageway to an inlet of the reactor. Valve means may be provided in the passageway to close off the passageway so as to isolate the housing from the reactor. A plurality of cylinders are rotatably mounted within the housing about an axis thereof such that each of the cylinders may be aligned with the port in the housing. Each of the cylinders have a piston and a ram. The ram comprises a sensing device such as a thermocouple. Means are provided for moving the piston within the cylinder such that when a cylinder is aligned with the housing's port, the sensing device may be positioned in the reactor.

The present invention will be described in more detail hereinafter in conjunction with the drawings wherein:

FIG. 1 is a diagrammatic view illustrating the positioning of the apparatus of the present invention with respect to a reactor;

FIG. 2 is a sectional view shown partly in elevation of the apparatus of the invention;

FIG. 3 is a transverse sectional view taken along line 3—3 of FIG. 2;

FIG. 4 is a schematic view which illustrates the positioning of a reaming tool in the passageway between the reactor and the housing of the apparatus of the present invention; and FIG. 5 is a transverse sectional view taken along line 5—5 of FIG. 4.

Referring now to the drawings, attention is first directed to FIG. 1 which shows a reactor 10 and the apparatus of the present invention generally indicated at 20. Reactor 10 may be a reactor used in a coal gasification plant, or it may be any other type of pressurized envelope or enclosure. The present invention is specifically directed to a method and means for remotely replacing sensing devices in a reactor wherein the internal conditions of the reactor are such that it would otherwise be necessary to shutdown the reactor to replace the sensing devices. A coal gasification plant reactor operates at very high temperatures and pressures. Without the present invention, it would be necessary to shut down such a reactor to replace malfunctioning sensing devices. The present invention is not limited to use with a particular type of sensing device; it may be used with any type of sensing device positioned in the interior of a reactor. For purposes of illustration, however, the sensing device described in conjunction with the present invention will be a thermocouple.

Referring to FIG. 2, the apparatus of the present invention is shown in greater detail. As illustrated, the present invention includes a housing or pressure vessel 22 located adjacent to reactor 10. Housing 22 is pressure-tight and is designed to withstand the operating pressures of the reactor. The housing is supported on the reactor by any appropriate means such as by structural members 24 and 26. The housing may be positioned vertically with respect to the reactor as shown, or it may be in a horizontal position relative to the reactor.

Housing 22 has a port or outlet 28 for establishing communication with the reactor. To this end, a passageway 30 exists between outlet 28 and an inlet 12 of the reactor. The passageway is pressure-tight, and like housing 22, it is able to contain the reactor pressures. Two block valves 32 and 34 are located in passageway 30, and a bleeder valve 36 is located intermediate of the two block valves. The double block and bleeder valve arrangement is a common arrangement for blocking off a vessel from high pressure. This permits housing 22 to be isolated from reactor 10 so that personnel can gain access to the housing.

Four hydraulically operated cylinders 40, 42, 44, 46, see FIG. 3, are removably mounted on a disc-shaped support 48 within housing 22. Support 48 in turn is mounted on a shaft 50. Support 48 can rotate about its axis relative to the housing due to the provisions of bearings 52 and 54 and supporting shaft 50. The hydraulic cylinders are situated radially outwards from shaft 50 about the outer circumference of support 48. The cylinders extend downwardly from support 48 to be substantially parallel to shaft 50. The location of shaft 50 and the radial placement of the cylinders are such that when support 48 and thus the cylinders are rotated, any one of the cylinders may be aligned or registered with outlet 28. In this sense, the apparatus of the present invention operates much like a revolver in that the chambers of the revolver may be registered in line with the barrel. It is to be also understood that more or fewer cylinders may be used as deemed operably desirable.

Each hydraulic cylinder has a piston 56, of which only two are shown, to which a ram 58, only three are illustrated, is disconnectably attached. Each ram includes a sensing device, and in the embodiment described, the sensing device is a thermocouple. Accordingly, the rams comprise a heavy wall metal tubular member having a heat resistant tip 58a at the end thereof remote from the piston. The heat resistant tip can be a ceramic shield which is designed to protect the thermocouple from the temperatures of the reactor. Thermocouple wires 60, of which only one set is illustrated, are run from an electrical outlet 62 through each of the rams to the particular thermocouple's "hot junction" 64, only one shown, located within heat resistant tip 58a of each ram.

As is known, a thermocouple comprises two dissimilar metal wires 60 brazed together at either end. One end of the wires is at a known temperature and is called the "cold junction". The other end is exposed to the unknown temperature and is called the "hot junction" 64. A measurable electric current flows between the junctions, and it is calibrated so as to give the temperature at the "hot junction".

Each cylinder is provided with two ports 66 and 68, one each on either side of piston 56. Ports 66 and 68 are connected to a hydraulic source, not illustrated, through a hydraulic control "black box" 70 and hydraulic lines 72 and 74, which extend through housing 22. Hydraulic fluid flows into and out of the cylinders by means of the hydraulic lines to cause the piston within the cylinder to move in the desired direction. Other devices, such as an electric motor with rack and pinion gears, may be used to actuate the ram.

Operation of the invention may begin by rotating support 48 to align or register a selected one of cylinders 40, 42, 44, 46 with outlet 28. Support 48 may be rotated by remote control. A hydraulic rotating device similar to that used to automatically position machine tools on a cutting lathe may be used to rotate the support and cylinders. This type of device is well-known in the art and is not illustrated or described in detail herein. Other devices, such as an electric motor and gear combination, may also be used to rotate the support and cylinders.

After a selected cylinder has been aligned with outlet 28, block valves 32 and 34 may be opened, if they are not already open, to open passageway 30, thereby bringing housing 22 up to the reactor pressure. A purge of inert gas can be used to pressurize housing 22, through purge valve 76 and line 78, before opening block valves 32 and 34 to minimize the flow of molten slag from the reactor into the housing. The purge can be used continuously during operation for the same purpose. On shut down the inert gas can be used to purge housing 22 through vent 79 to make it safe for entry.

With the selected cylinder aligned with outlet 28 and with passageway 30 open, the hydraulic cylinder is remotely activated so that the piston therein moves in a downward direction with respect to the cylinder, inserting the ram thereof a predetermined distance into the reactor. As shown in FIG. 2, cylinder 46 is registered with passageway 30 and has its ram 58, which includes a thermocouple, positioned within reactor 20. The thermocouple is thus exposed to the interior atmosphere of the reactor to measure the reactor's interior temperature.

When the thermocouple becomes damaged and is no longer operable, it may be remotely retracted from the interior of the reactor by activating cylinder 46 to cause its piston to move in an upward direction with respect to the cylinder. After the ram of cylinder 46 has been withdrawn from the reactor, disk 48 is again rotated to align one of the cylinders 40, 42 or 44 with passageway 30. Once a cylinder with an operative thermocouple has been aligned with passageway 30, the piston of that cylinder is caused to move to position its ram and thus the thermocouple within the reactor. The time sequence for this operation - removing the damaged thermocouple and inserting an operable one - may be less than a minute, giving an operator reliable temperature control of the process being carried out in the reactor.

After the four rams or thermocouples have all been damaged, housing 22 may be isolated from reactor 10 by closing the double block and bleeder valve arrangement. Housing 22 may then be vented by means of vent valve 77 and vent line 79. The upper portion 22a of housing 22, which is removably secured in an appropriate, pressure-tight manner to the housing, may then be removed by maintenance personnel so that the entire disk-cylinder assembly may be lifted out of the housing in order to replace the damaged rams. To this end, disk 48 could be removably mounted to shaft 50. Alternatively, the individual cylinders, which are disconnectably connected to disk 48, may be removed for replacement of the rams. After the damaged rams have been replaced, the apparatus may be reassembled for operation. It would also be possible to utilize the two disk-cylinder assemblies so that when the rams of one are being replaced, the other assembly may be in operation.

If slagging over or plugging of the entry opening or passageway 30 to the reactor is a problem, a suitable drill or broach could be incorporated into the disk-cylinder assembly. The drill or broach would be remotely operated to ream out passageway 30. As shown in FIGS. 4 and 5, the disk-cylinder assembly includes a hydraulically-operated broach or reaming tool 90. Reaming tool 90 comprises a cylinder 92 in which a piston 94 travels in response to the direction of flow of hydraulic fluid through lines 96 and 98. The flow of hydraulic fluid through lines 96 and 98 is controlled by means of control "black box" 70. Member 100 of tool 90 is designed to remove the slag from or unplug passageway 30. Once passageway 30 has been cleared, reaming tool 90 would be withdrawn, and the disk-cylinder assembly would be rotated so that a sensing device could then be inserted into the reactor.

Although certain specific embodiments of the invention have been described in detail, the invention is not to be limited to only such embodiments, but rather only by the appendant claims.

What is claimed is:

1. An apparatus for remotely positioning sensing devices in a reactor, during operation of the reactor, comprising:
   a pressure-tight housing located adjacent to the reactor;
   a passageway between a port in said housing and an inlet of the reactor;

valve means in said passageway for isolating said housing from the reactor;

a plurality of cylinders rotatably mounted within said housing about an axis thereof such that each of said cylinders may be aligned with said port;

a piston including a ram in each of said cylinders wherein said rams include a sensing device; and means for moving said ram of said cylinder aligned with said port so as to position the sensing device in the reactor.

2. The apparatus of claim 1 wherein there are four of said cylinders.

3. The apparatus of claim 1 further including means for purging said housing.

4. The apparatus of claim 1 wherein said valve means includes a bleeder valve positioned between two block valves.

5. The apparatus of claim 1 wherein the sensing devices are thermocouples.

6. The apparatus of claim 5 wherein said rams comprise a tubular member with a heat-resistant tip located at the end thereof remote from said piston.

7. The apparatus of claim 6 wherein thermocouple wires are enclosed within said rams and electrically connected to a hot junction within said heat-resistant tip.

8. The apparatus of claim 7 wherein said rams may be detached from said pistons for replacement thereof.

9. The apparatus of claim 1 further including means for venting said housing.

10. The apparatus of claim 1 further including means for clearing said passageway.

11. An apparatus for remote positioning of sensing devices in a reactor under pressure, comprising:

a pressure vessel located adjacent to the reactor, said pressure vessel able to contain the reactor pressure;

a fluid-tight passageway between an outlet of said pressure vessel and an inlet of the reactor;

valve means in said passageway for closing-off said passageway to isolate said pressure vessel from the reactor;

a plurality of hydraulic cylinders rotatably mounted within said pressure vessel about an axis thereof such that any of said cylinders may be aligned with said outlet of said pressure vessel;

a piston with a ram attached thereto in each of said cylinders wherein said ram includes a sensing device;

means for rotating said plurality of cylinders about said axis in said pressure vessel to align any one of said cylinders with said outlet of said pressure vessel; and means for moving said piston of said cylinder aligned with said outlet of said pressure vessel so that said ram thereof may be inserted into and removed from the reactor through said passageway.

12. An apparatus for remote positioning of sensing devices in a reactor under pressure, comprising:

a pressure vessel located adjacent to the reactor, said pressure vessel able to contain the reactor pressure;

a fluid-tight passageway between an outlet of said pressure vessel and an inlet of the reactor;

valve means in said passageway for closing-off said passageway to isolate said pressure vessel from the reactor;

a plurality of hydraulic cylinders rotatably mounted within said pressure vessel about an axis thereof such that each of said cylinders may be registered with said outlet of said pressure vessel;

a piston in each of said cylinders with a ram removably attached to that side of said piston facing said outlet of said pressure vessel, said ram including a sensing device;

means for remotely rotating said plurality of cylinders about said axis of said pressure vessel to register any one of said cylinders with said outlet of said pressure vessel; and means for remotely moving said piston within said cylinder so that said ram of said cylinder registered with said outlet of said pressure vessel may be inserted into and removed from the reactor by means of said passageway.

13. The apparatus of claim 12 wherein there are four of said cylinders.

14. The apparatus of claim 12 further including means for purging said housing with an inert gas.

15. The apparatus of claim 12 further including means for venting said housing.

16. The apparatus of claim 12 wherein said valve means includes a bleeder valve positioned between two block valves for blocking-off the reactor pressure from said pressure vessel.

17. The apparatus of claim 12 wherein the sensing devices are thermocouples.

18. The apparatus of claim 17 wherein said rams comprise a heavy wall metal tubular member with a heat-resistant tip located at the end thereof remote from said piston.

19. The apparatus of claim 18 wherein electrical leads are enclosed within said tubular member to be electrically connected to a hot junction within said heat-resistant tip.

20. The apparatus of claim 12 wherein said rams may be detached from said pistons for replacement thereof.

21. The apparatus of claim 12 further including means for removing slag from said passageway.

22. A method for remotely positioning a sensing device in a reactor under pressure, comprising:

rotating a plurality of hydraulic cylinders located in a pressure vessel about an axis thereof to align a selected one of said cylinders with an outlet in said pressure vessel;

moving a piston within said cylinder aligned with said outlet to move a ram of said piston through said outlet, said ram including a sensing device; and further moving said piston of said cylinder aligned with said outlet to cause said ram to move through a fluid-tight passageway connecting said outlet of said pressure vessel to an inlet of the reactor and through said inlet a predetermined distance into the reactor.

23. The method of claim 22 further including the steps of:

withdrawing said ram from the reactor and into said pressure vessel through said passageway;

rotating said plurality of cylinders about said axis of said pressure vessel to align another of said cylinders with said outlet; and moving said piston of said cylinder aligned with said outlet to insert said ram thereof a predetermined distance into the reactor.

24. A method for remotely positioning a sensing device in a reactor during operation thereof, comprising:

positioning a pressure vessel adjacent to the reactor;

establishing a fluid-tight passageway between said pressure vessel and the reactor, said passageway including valve means for closing off said passageway to isolate said pressure vessel from the reactor;

rotatably mounting a plurality of hydraulic cylinders within said pressure vessel about an axis thereof such that each of said cylinders may be aligned with said passageway, each of said cylinders having a piston with a ram removably attached thereto wherein said ram includes a sensing device;

rotating said plurality of cylinders about said axis in said pressure vessel to align one of said cylinders with said passageway; and with said passageway opened, moving said piston of said cylinder aligned with said passageway to insert said ram thereof a predetermined distance into the reactor.

25. The method of claim 24 further including the steps of:

removing said ram from the reactor through said passageway;

thereafter rotating said plurality of cylinders about said axis of said pressure vessel to align another of said cylinders with said passageway; and moving said piston of said cylinder aligned with said passageway to insert said ram thereof into the reactor.

26. The method of claim 25 wherein said ram removed from the reactor has an inoperative sensing device and said ram thereafter inserted in the reactor has an operative sensing device.

27. The method of claim 24 further including the steps of:

removing said ram inserted in the reactor;

actuating said valve means to close off said passageway;

venting said pressure vessel; and replacing the sensing devices of said rams of said cylinders.

28. The method of claim 24 including the step of flowing inert gas into the reactor after said passageway is opened and prior to insertion of said ram of said cylinder into the reactor.

29. The method of claim 24 including the step of removing slag from said passageway prior to insertion of said ram of said cylinder into the reactor.

* * * * *